US012307973B2

(12) United States Patent
Ye et al.

(10) Patent No.: US 12,307,973 B2
(45) Date of Patent: May 20, 2025

(54) DISPLAY PANEL AND DISPLAY DEVICE WITH ANTI-VIEW PIXEL DRIVING CIRCUITS CONNECTED TO SUB-PIXEL

(71) Applicant: HKC CORPORATION LIMITED, Shenzhen (CN)

(72) Inventors: Zhiwei Ye, Shenzhen (CN); Xiufeng Zhou, Shenzhen (CN); Chen Chen, Shenzhen (CN); Ting Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/608,485

(22) Filed: Mar. 18, 2024

(65) Prior Publication Data

US 2025/0006124 A1 Jan. 2, 2025

(30) Foreign Application Priority Data

Jun. 30, 2023 (CN) ......................... 202310803436.3

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01); *G09G 2320/0626* (2013.01); *G09G 2330/02* (2013.01)

(58) Field of Classification Search
CPC ... G09G 3/32; G09G 2300/00; G09G 2330/02
See application file for complete search history.

(56) References Cited

U.S. PATENT DOCUMENTS

2021/0201790 A1* 7/2021 Gai ...................... G09G 3/3233
2022/0328589 A1* 10/2022 Chen .................... G09G 3/3266
(Continued)

FOREIGN PATENT DOCUMENTS

CN 102540528 7/2012
CN 108020940 5/2018
(Continued)

OTHER PUBLICATIONS

CNIPA, First Office Action for CN Application No. 202310803436.3, Aug. 13, 2024.

*Primary Examiner* — Benjamin C Lee
*Assistant Examiner* — Nathan P Brittingham
(74) *Attorney, Agent, or Firm* — Hodgson Russ LLP

(57) ABSTRACT

A display panel includes: a plurality of sub-pixel driving circuits each of which is electrically connected to at least one scan line; a plurality of anti-view pixel driving circuits. The anti-view pixel driving circuit includes an anti-view light-emitting part and an anti-view switch tube for controlling an on and off of the anti-view light-emitting part; and the anti-view pixel driving circuits are respectively connected to the sub-pixel driving circuits such that a control end of the anti-view switch tube of the anti-view pixel driving circuit shares the scan line with the corresponding sub-pixel driving circuit. Scanning signals are input to the scan lines of at least two sub-pixel driving circuits at different times during a line scanning process, such that the scanning signals are input to the control ends of the anti-view switch tubes of at least two anti-view pixel driving circuits at different times.

16 Claims, 4 Drawing Sheets

(56) References Cited

U.S. PATENT DOCUMENTS

| | | | | |
|---|---|---|---|---|
| 2022/0397709 | A1* | 12/2022 | Han | G02B 5/201 |
| 2023/0096638 | A1* | 3/2023 | Lou | H10K 59/126 257/40 |
| 2023/0100284 | A1* | 3/2023 | Yao | G09G 3/20 345/55 |

FOREIGN PATENT DOCUMENTS

| | | | | |
|---|---|---|---|---|
| CN | 115273661 | | | 11/2022 |
| CN | 218826045 | | | 4/2023 |
| CN | 116338995 | A | * | 6/2023 |
| JP | 2007233373 | | | 9/2007 |
| JP | 2011023240 | | | 2/2011 |

* cited by examiner

DISPLAY PANEL AND DISPLAY DEVICE WITH ANTI-VIEW PIXEL DRIVING CIRCUITS CONNECTED TO SUB-PIXEL

CROSS-REFERENCE TO RELATED APPLICATIONS

This application claims priority to Chinese Patent Application No. 202310803436.3, filed Jun. 30, 2023, the entire disclosure of which is incorporated herein by reference.

TECHNICAL FIELD

The present disclosure relates to the field of displaying technologies, and more particularly, to a display panel and a display device.

BACKGROUND

An organic light emitting diode (OLED) display panel has the advantages like small thickness, high brightness, low power consumption, fast response, wide color gamut and so on, and thus is widely used in electronic products such as TVs, mobile phones, notebooks. With the increasingly-wide applications of the TVs, mobile phones, notebooks and other electronic products, the protection of personal information and confidential information has become a problem that cannot be ignored.

At present, the most important anti-view way is to stick a layer of anti-view film on a surface of the display panel. The anti-view film reduces a brightness of the display panel and affects a visual effect of a screen of the display panel, and the anti-view film needs to be removed manually when the user wants to switch the screen back to a sharing mode, which affects a sharing effect of the screen.

Therefore, a display panel using anti-view pixels to prevent peeping has been proposed. In the sharing mode, the anti-view pixels are turned off. In the anti-view mode, the anti-view pixels are turned on, and the light emitted by the anti-view pixels is used as the interference light to interfere with the information reading under the wide view angle, so as to realize the anti-view function. In this solution, the switching between an anti-view mode and the sharing mode can be realized by controlling the on and off of the anti-view mode, which avoids affecting the sharing effect of the screen. However, the interference effect caused by the above solution is limited, and the interference with the information reading is not reliable enough.

SUMMARY OF THE DISCLOSURE

There are provided a display panel and a display device according to embodiments of the present disclosure. The technical solution is as below:

According to an aspect of embodiments of the present disclosure, there is provided a display panel includes:

a plurality of sub-pixel driving circuits each of which is electrically connected to at least one scan line; and a plurality of anti-view pixel driving circuits each of which includes an anti-view light-emitting part and an anti-view switch tube for controlling an on and off of the anti-view light-emitting part, the anti-view pixel driving circuits being respectively connected to the sub-pixel driving circuits such that a control end of the anti-view switch tube of the anti-view pixel driving circuit shares the scan line with the corresponding sub-pixel driving circuit, wherein scanning signals are input to the scan lines of at least two sub-pixel driving circuits at different times during a line scanning process, such that the scanning signals are input to the control ends of the anti-view switch tubes of at least two anti-view pixel driving circuits at different times.

According to another aspect of the present disclosure, a display device is provided, including the above display panel and a motherboard connected to the display panel.

It should be understood that the general description above and the detailed description in the following text are only illustrative and do not limit the present disclosure.

BRIEF DESCRIPTION OF THE DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

DETAILED DESCRIPTION OF THE EMBODIMENTS

Figure 1:
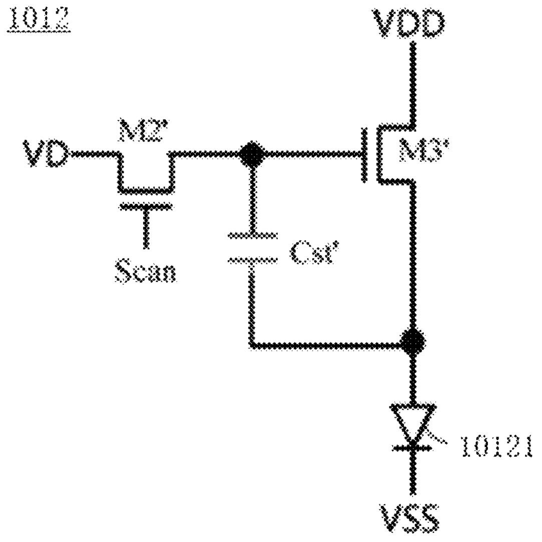
FIG. 1 is a schematic diagram of an anti-view pixel driving circuit in accordance with an embodiment of the present disclosure.

Although the invention can be easily expressed in different forms of embodiments, only some specific embodiments are shown in the drawings and will be described in detail in this specification. At the same time, it can be understood that this specification should be regarded as an exemplary description of the principles of the invention, and is not intended to limit the invention to those described here.

Thus, a feature pointed out in this specification will be used to illustrate one of the features of one embodiment of the invention, rather than implying that each embodiment of the invention must have the described feature. In addition, it should be noted that this specification describes many features. Although some features can be combined to show the possible system design, these features can also be used for other unspecified combinations. Thus, unless otherwise stated, the combination stated is not intended to be restrictive.

In the embodiment shown in the drawings, the direction indication (such as up, down, left, right, front, rear, etc.) is used to explain that the structure and movement of various elements of the invention are not absolute but relative. These descriptions are appropriate when these elements are in the positions shown in the attached drawings. If the description of the position of these elements changes, the indication of these directions also changes accordingly.

The exemplary embodiments will now be described more fully with reference to the accompanying drawings. However, the exemplary embodiments can be implemented in a variety of forms, and should not be understood as limited to the examples set forth herein; on the contrary, providing these exemplary embodiments makes the description of the present invention more comprehensive and complete, and comprehensively communicates the idea of the exemplary embodiments to those skilled in the art. The attached drawings are only schematic diagrams of the present invention and are not necessarily drawn to scale. The same reference numerals in the figure denote the same or similar parts, and therefore repeated descriptions thereof will be omitted.

An embodiment of the present disclosure provides a display panel, including a plurality of sub-pixel driving circuits and a plurality of anti-view pixel driving circuits.

The sub-pixel driving circuit is configured to drive a light-emitting part 10111 of the display panel to be turned on or off accordingly. It can be understood that, in an embodiment, the light-emitting part 10111 may emit red light to form a red sub-pixel, emit green light to form a green sub-pixel, or emit blue light to a blue sub-pixel. Each light-emitting part 10111 may be driven to emit light, such that the light of different colors emitted by the light-emitting parts 10111 can be mixed to form different colors and the display panel can display colorful pictures.

In an embodiment, each light-emitting part 10111 may be arranged to emit light independently, that is, each light-emitting part 10111 includes a light-emitting material emitting red light, green light or blue light, and correspondingly forms a R-red sub-pixel, a B-blue sub-pixel, or a G-green sub-pixel.

In an embodiment, the light color of the light-emitting part 10111 can also be realized by using a light color conversion technology. For example, a sub-pixel of the display panel includes a blue light emitting layer emitting blue light and a light color conversion layer made of light color conversion material. The blue light emitting layer can be located below a cathode layer, and the light color conversion layer can be located above the cathode layer. The light color conversion material such as quantum dots can convert the blue light emitted by the OLED into green light or red light, realizing the R-red sub-pixel and G-green sub-pixel. The B-blue sub-pixel includes a blue emitting layer emitting blue light. The blue light emitted by the blue light emitting layer can directly pass through the transparent area of the light color conversion layer without quantum dots, so as to emit blue light. Thus, the sub-pixel of the display panel can emit three primary color lights.

In an embodiment, the light color of the light-emitting part 10111 can also be realized by using a color filter film technology, which includes an OLED emitting white light and a color filter film. The color filter film is configured to filter the white light emitted by the OLED to realize a R-red sub-pixel, a B-blue sub-pixel and a G-green sub-pixel.

Figure 2:
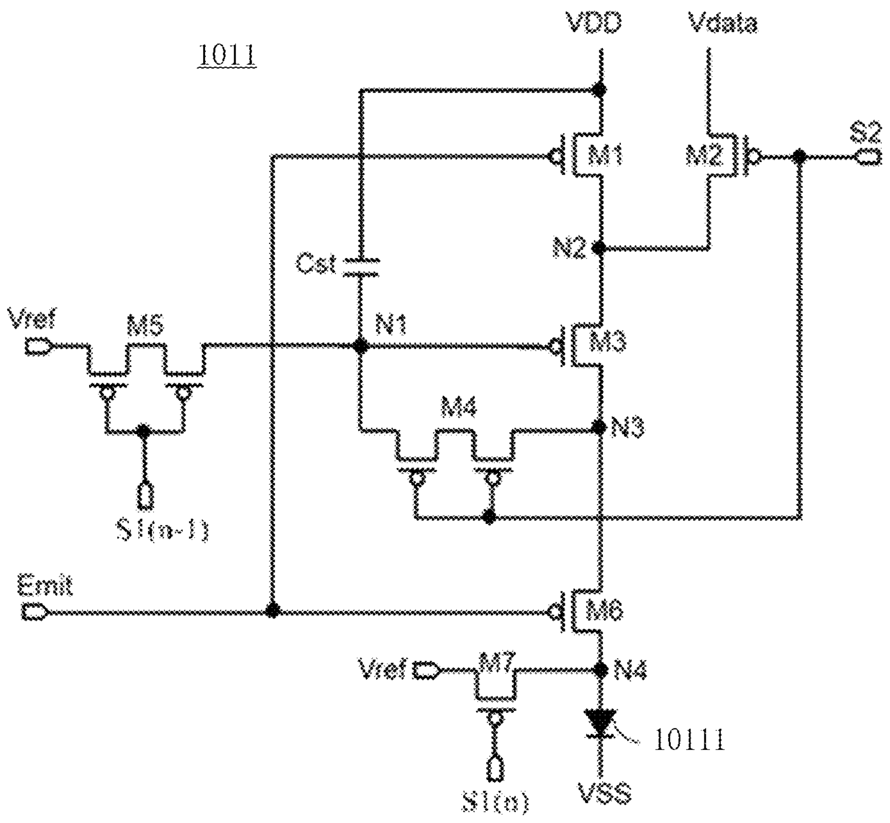
FIG. 2 is a schematic diagram of a sub-pixel driving circuit in accordance with an embodiment of the present disclosure.

Referring to FIG. 2, the sub-pixel driving circuit is electrically connected to at least one scan line. It can be understood that a scanning signal is input to the sub-pixel driving circuit through the scan line to realize a node reset of the sub-pixel driving circuit and/or the signal writing of the sub-pixel driving circuit.

Referring to FIG. 1, the anti-view pixel driving circuit includes an anti-view light-emitting part 10121 and an anti-view switch tube M2' for controlling an on and off of the anti-view light-emitting part 10121. When the anti-view light-emitting part 10121 is turned on by the anti-view switch tube M2', the light of the anti-view light-emitting part 10121 is used as an interference light to interfere with information reading in a wide viewing angle; when the anti-view light-emitting part 10121 is turned off through the anti-view switch tube M2', an anti-view mode is closed. Thus, the anti-view switch tube M2' controls the on and off of the anti-view light-emitting part 10121 to switch between a sharing mode and the anti-view mode accordingly, which improves the sharing effect of the display panel.

In an embodiment, the anti-view pixel driving circuits are respectively connected to the sub-pixel driving circuits such that a control end of the anti-view switch tube M2' of the anti-view pixel driving circuit shares the scan line with the sub-pixel driving circuit. As shown in FIG. 2, the scan line can be understood with reference to any or more of the scan line (n-1), the scan line S1(*n*), and the scan line S2. The scanning signals are input to the scan lines of at least two sub-pixel driving circuits at different times during the line scanning process. In such a way, the scanning signals are input to the control ends of the anti-view switch tubes M2' of at least two anti-view pixel driving circuits at different times during the line scanning process. Thus, during the line scanning process, at least two anti-view light-emitting parts 10121 are lighted at different times to arrive at the effect that the anti-view light-emitting parts 10121 flicker dynamically, which can better attract the attention of the peeper than the way that all anti-view light-emitting parts 10121 are lighted at the same time, significantly increase the interference effect, and improve the anti-view performance of the display panel. Furthermore, the anti-view pixel driving circuit shares the scan line with the sub-pixel driving circuit, which has a simple structure and a convenient transformation, and facilitates the promotion of the display panel.

In order to further improve the anti-view effect, in an embodiment, the anti-view pixels are arranged to have different brightness and be lighted at different times. For example, the display panel further includes a plurality of driving tubes respectively electrically connected to the scan lines. The driving tubes have different sizes. Due to the driving tubes of different sizes, strengths of the scanning signals input to the anti-view switch tubes M2' of the anti-view pixel driving circuits are different, the anti-view switch tubes M2' of the anti-view pixel driving circuit are turned on to different degrees. Accordingly, the anti-view light-emitting parts 10121 have different brightness and a brightness difference between the anti-view light-emitting parts 10121 is formed, which, compared with the way that all anti-view light-emitting parts 10121 have the same brightness, can better attract the attention of the peeper. Moreover, in combination with the dynamic flickering effect of the anti-view light-emitting parts 10121 as a result of the different inputting times of the scanning signals, the interference effect and reliability of the anti-view function are further improved.

Furthermore, in an embodiment, each scan line of each sub-pixel driving circuit is provided with signal by a separate GOA (Gate on Array) driving tube. The GOA driving tubes have different sizes. That is, the anti-view pixel driving circuits are connected to different scan lines of different sub-pixel driving circuits, the scanning signals are input to different sub-pixel driving circuits at different times and the anti-view light-emitting parts 10121 are turned on at different times based on the scanning signals, and the anti-view light-emitting parts 10121 have different brightness due to the GOA driving tubes of different sizes. In this way, the anti-view light-emitting parts 10121 have different brightness and are turned on at different times, which improves the interference effect and thus further improves the reliability of the anti-view function.

Referring to FIG. 2, the sub-pixel driving circuit is further electrically connected to a power supply voltage line VDD and a common ground voltage line VSS. The anti-view pixel driving circuit includes at least one OLED component (i.e. anti-view light-emitting part 10121) and a 2TIC circuit. The 2TIC circuit includes a driving tube M3', an anti-view switch tube M2' and a first data line VD. The power supply voltage line VDD and the common ground voltage line VSS of the sub-pixel driving circuit are used as two power supply lines of the 2TIC circuit, and the 2TIC circuit is connected to a control signal line Scan which shares the scanning signal of the scan line with the sub-pixel driving circuit. The scanning signal can be one selected from the signals S1(*n*-1), S1(*n*) and S2 shown in FIG. 2, and the on or off of the anti-view switch tube M2' is controlled by the control signal Scan.

In this embodiment, the anti-view light-emitting part 10121 is controlled to be turned on or off based on the scanning signal of the sub-pixel driving circuit. In this way, the scanning signals are input to different anti-view pixel driving circuits at different times, and the anti-view light-emitting parts 10121 driven by different anti-view pixel driving circuits are lighted at different times accordingly. For example, the signals S1(*n*-1), S1(*n*) and S2 are input to the anti-view pixel driving circuits at different times, and the anti-view light-emitting parts 10121 driven by the anti-view pixel driving circuits respectively provided with the signals S1(*n*-1), S1(*n*), and S2 are lighted at different times, which achieves a better interference effect. Moreover, the display panel of the embodiment has the advantages of simple structure, easy assembly and low cost.

In this embodiment, the anti-view pixel driving circuit shares not only the scan line with the sub-pixel driving circuit, but also the power supply voltage line VDD and the common ground voltage line VSS with the sub-pixel driving circuit, thus, separate layouts for the power supply voltage line VDD and the common ground voltage line VSS of the anti-view pixel driving circuit can be omitted, which has simple structure and convenient transformation, and facilitates the promotion of the display panel.

As shown in FIG. 1, the anti-view pixel driving circuit includes the anti-view switch tube M2', the anti-view driving tube M3' and a first capacitor Cst'. A first end of the anti-view driving tube M3' shares the power supply voltage line VDD with the sub-pixel driving circuit, and a second end of the anti-view driving tube M3' is electrically connected to a first node. One end of the anti-view light-emitting part 10121 is electrically connected to the first node, and the other end thereof shares the common ground voltage line VSS with the sub-pixel driving circuit. A control end of the anti-view driving tube M3' is electrically connected to a second node. The first capacitor Cst' is connected between the first node and the second node. A first end of the anti-view switch tube M2' is electrically connected to the second node, and a second end thereof is electrically connected to the first data line VD. The control end of the anti-view switch tube M2' is connected to the signal line Scan, which is one of the scan lines of the sub-pixel driving circuit, such as the line S2, the line S1(*n*-1) or the line S1(*n*) shown in FIG. 2.

In an embodiment, the signal input to the second end of the anti-view switch tube M2' through the first data line VD is a DC signal; an identical DC signal is input to the second ends of the anti-view switch tubes M2' of multiple anti-view pixel driving circuit 1012, or the second ends of the anti-view switch tubes M2' of multiple anti-view pixel driving circuit 1012 are respectively connected to different pins of a driving IC to receive different DC signals.

Referring to FIG. 2, the sub-pixel driving circuit is electrically connected to a first scan line, a second scan line, and a third scan line, for example, the line S2, the line S1(*n*-1), or the line S1(*n*). Scanning signals are respectively input to the first scan line, the second scan line and the third scan line at different times during the line scanning process.

Figure 7:
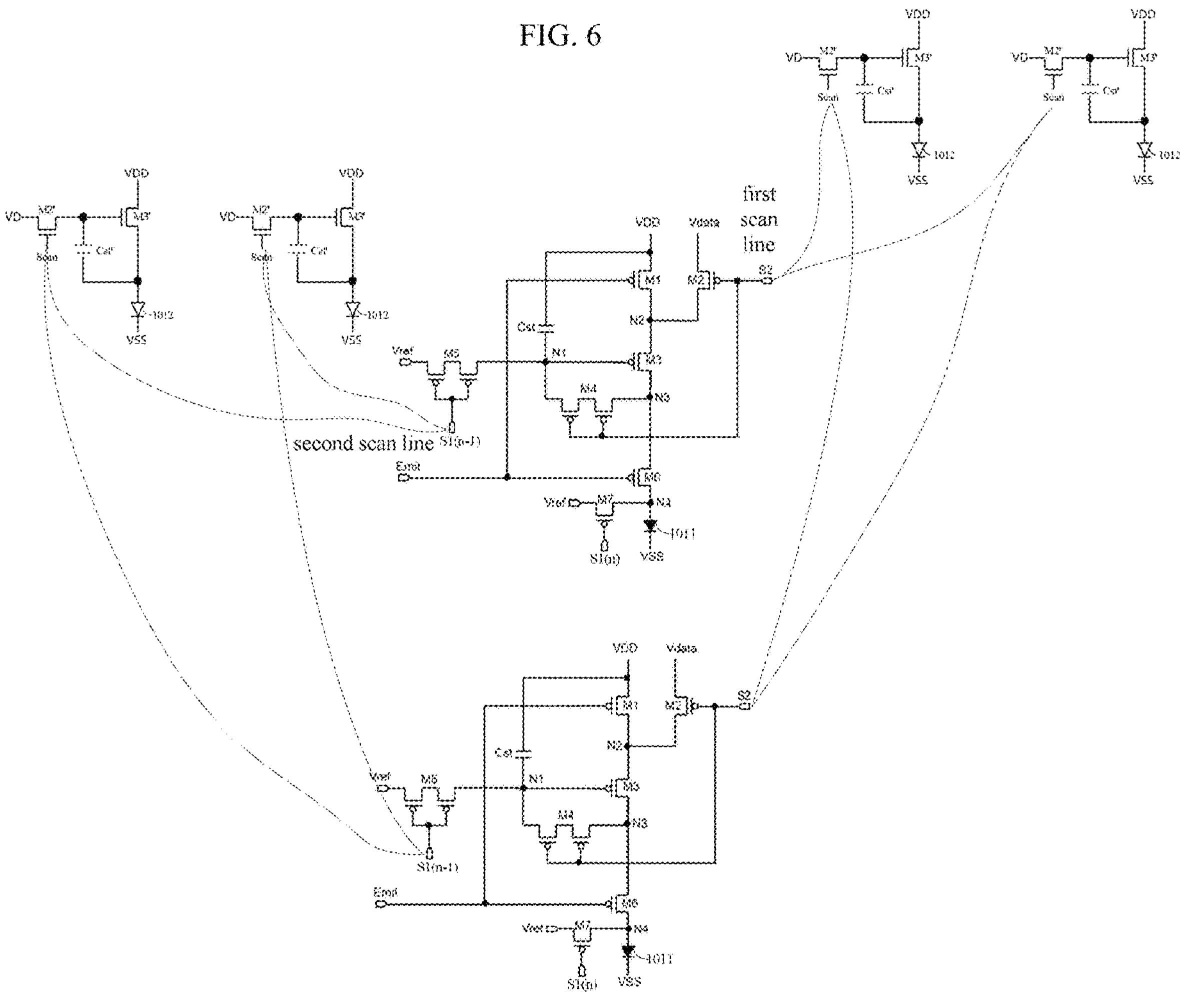
FIG. 7 is a schematic diagram of the control ends of the anti-view switch tubes of a part of the plurality of anti-view pixel driving circuits sharing the first scan line with the plurality of sub-pixel driving circuits corresponding to the part of the plurality of anti-view pixel driving circuits in accordance with an embodiment of the present disclosure.

Among the multiple anti-view pixel driving circuits, as shown in FIG. 7, the control ends of the anti-view switch tubes of a part of the anti-view pixel driving circuits share the first scan line with the sub-pixel driving circuits corresponding to the anti-view pixel driving circuits, and the control ends of the anti-view switch tubes of another part of the anti-view pixel driving circuits share the second scan line with the sub-pixel driving circuits corresponding to the anti-view pixel driving circuits, and the control ends of the anti-view switch tubes of the remaining part of the anti-view pixel driving circuits share the third scan line with the sub-pixel driving circuits corresponding to the anti-view pixel driving circuits. Based on the time sequence in which the scanning signals are input to the first scan line, the second scan line, and the third scan line, the anti-view light-emitting parts 10121 are controlled to be lighted in the same time sequence. In this way, the multiple anti-view light-emitting parts 10121 are roughly divided into three parts according to the scan lines connected thereto, and the anti-view light-emitting parts 10121 of the three parts are lighted in turn according to the time sequence in which the scanning signals are input to the three scan lines, which can significantly improve the anti-view effect.

Taking the sub-pixel driving circuit electrically connected to the first scan line, the second scan line and the third scan line as an example, the circuit structure of the sub-pixel driving circuit is illustrated in more detail as follows.

Referring to FIG. 2, the sub-pixel driving circuit includes a first switch tube M1, a second switch tube M2, a third switch tube M3, a fourth switch tube M4, a fifth switch tube M5, a sixth switch tube M6, a seventh switch tube M7, and a second capacitor Cst.

A control end of the first switch tube M1 is electrically connected to a control signal line Emit, a first end of the first switch tube M1 is electrically connected to the power supply voltage line VDD, and a second end of the first switch tube M1 is electrically connected to a second sub-node N2. A control end of the second switch tube M2 is electrically connected to the first scan line S2, a first end of the second switch tube M2 is electrically connected to a second data line Vdata, and a second end of the second switch tube M2 is electrically connected to the second sub-node N2. A control end of the third switch tube M3 is electrically connected to a first sub-node N1, a first end of the third switch tube M3 is electrically connected to the second sub-node N2, and a second end of the third switch tube M3 is electrically connected to a third sub-node N3. One end of the second capacitor Cst is electrically connected to the power supply voltage line VDD, and the other end of the second capacitor Cst is electrically connected to the first sub-node N1. A control end of the fourth switch tube M4 is electrically connected to the first scan line S2, a first end of the fourth switch tube M4 is electrically connected to the third sub-node N3, and a second end of the fourth switch tube M4 is electrically connected to the first sub-node N1. A control end of the fifth switch tube M5 is electrically connected to a second scan line S1(*n*-1), a first end of the fifth switch tube M5 is electrically connected to a reference voltage signal line Vref, and a second end of the fifth switch tube M5 is electrically connected to the first sub-node N1. A control end of the sixth switch tube M6 is electrically connected to the control signal line Emit, a first end of the sixth switch tube M6 is electrically connected to the third sub-node N3, and a second end of the sixth switch tube M6 is electrically connected to a fourth sub-node N4. A control end of the seventh switch tube M7 is electrically connected to the third scan line S1(*n*), a first end of the seventh switch tube M7 is electrically connected to the reference voltage signal line Vref, and a second end of the seventh switch tube M7 is electrically connected to the fourth sub-node N4. The fourth sub-node N4 is electrically connected to the common ground voltage line VSS. The light-emitting part 10111 is connected in series between the fourth sub-node N4 and the common ground voltage line VSS. In this way, S1(*n*-1) is configured to reset the first sub-node N1, S1(*n*) is configured to reset the fourth sub-node N4, S2 is configured to write the signal, and the three groups of scanning signals Scan are turned on at different times.

Figure 3:
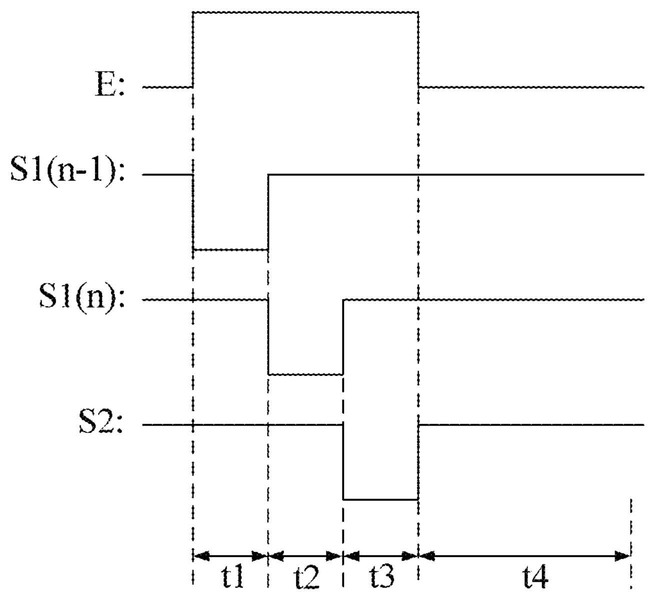
FIG. 3 is a time sequence diagram in accordance with an embodiment of the present disclosure.

In combination with the time sequence diagram shown in FIG. 3, it can be understood that the working process of the sub-pixel driving circuit roughly includes a first reset stage t1, a second reset stage t2, a charging stage t3, and a light emitting stage t4.

In the first reset stage t1, the second scan line S1(*n*-1) controls the fifth switch tube M5 to be turned on, and the first sub-node N1 is reset by a reference voltage provided by the reference voltage signal line Vref through the fifth switch tube M5.

In the second reset stage t2, the third scan line S1(*n*) controls the seventh switch tube M7 to be turned on, and the fourth sub-node N4 is reset by the reference voltage provided by the reference voltage signal line Vref through the seventh switch tube M7.

In the charging phase t3, the first scan line S2 controls the second switch tube M2 and the fourth switch tube M4 to be turned on, and the signal provided by the second data line Vdata is written to the second sub-node N2 through the second switch tube M2. In the charging stage t3, the third switch tube M3 is turned on to change the potential of the first sub-node N1.

In the light emitting stage t4, the first switch tube M1, the third switch tube M3 and the sixth switch tube M6 are all turned on, and the light-emitting part 10111 is lighted.

The anti-view pixel driving circuits are connected to different scan lines of different sub-pixel driving circuits, namely, the second scan line S1(*n*-1), the third scan line S1(*n*), and the first scan line S2, such that the anti-view light-emitting parts 10121 are turned on at different times, and the anti-view light-emitting parts 10121 and the lighting times of the light-emitting part 10111 are lighted at different times accordingly, which can achieve a more significant anti-view effect.

In an embodiment, for any three adjacent anti-view light-emitting parts 10121 in the same row, the anti-view pixel driving circuit having one anti-view light-emitting part 10121 shares the first scan line with the sub-pixel driving circuit corresponding to the anti-view pixel driving circuit, and the anti-view pixel driving circuit having another anti-view light-emitting parts 10121 shares the second scan line with the sub-pixel driving circuit corresponding to the anti-view pixel driving circuit, and the anti-view pixel driving circuit having the remaining anti-view light-emitting parts 10121 shares the third scan line with the sub-pixel driving circuit corresponding to the anti-view pixel driving circuit. In this way, in the line scanning process, the adjacent anti-view light-emitting parts 10121 can be lighted at different times through different scanning signals, which can form a more obvious lighting sequence gradient change and thus further improve the interference effect and the anti-view performance.

Figure 4:
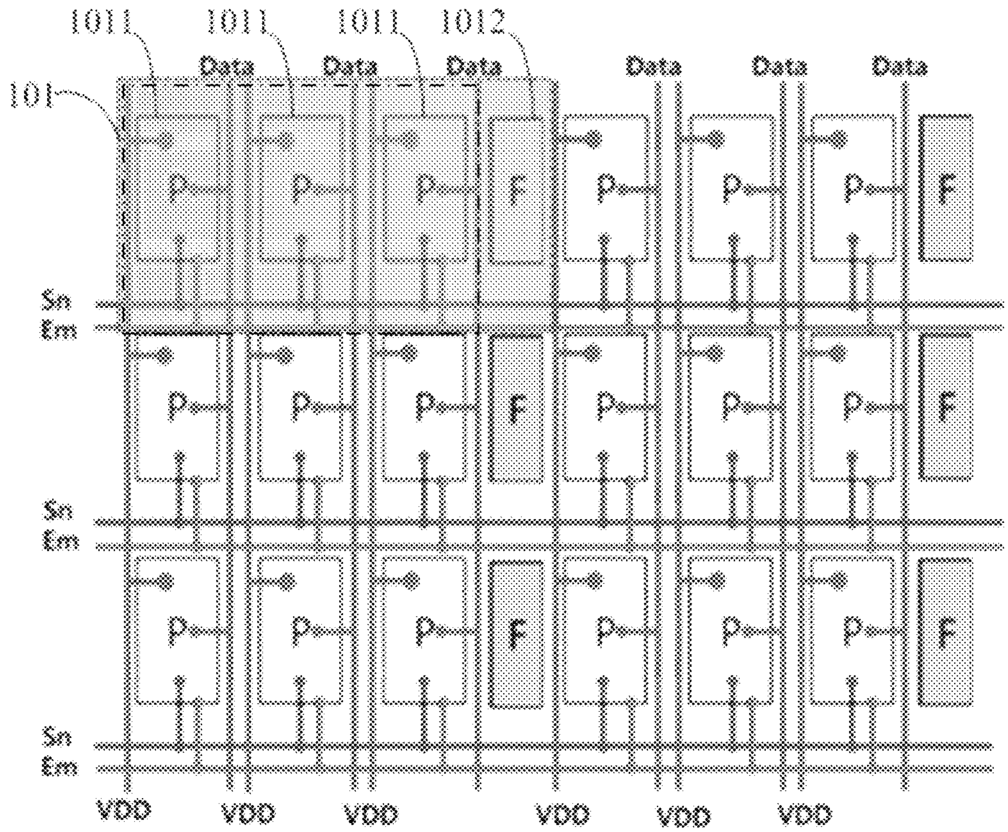
FIG. 4 is a schematic diagram of a pixel architecture of a display panel in accordance with an embodiment of the present disclosure.

Referring to the schematic diagram of the pixel architecture illustrated in FIG. 4, for example, the display panel includes a plurality of display pixel units 101, and each display pixel unit 101 includes a plurality of the sub-pixels P. Each display pixel unit 101 includes three sub-pixels1, namely a R-red sub-pixel, a B-blue sub-pixel and a G-green sub-pixel. At least one anti-view pixel F is arranged between two adjacent display pixel units 101. Each sub-pixel P responds to a sub-pixel driving circuit 1011. Each sub-pixel F responds to an anti-view driving circuit 1012. It can be understood that the two adjacent anti-view pixels F are separated by the display pixel unit 101, and the three adjacent anti-view pixels F are separated by two display pixel units 101.

Figure 5:
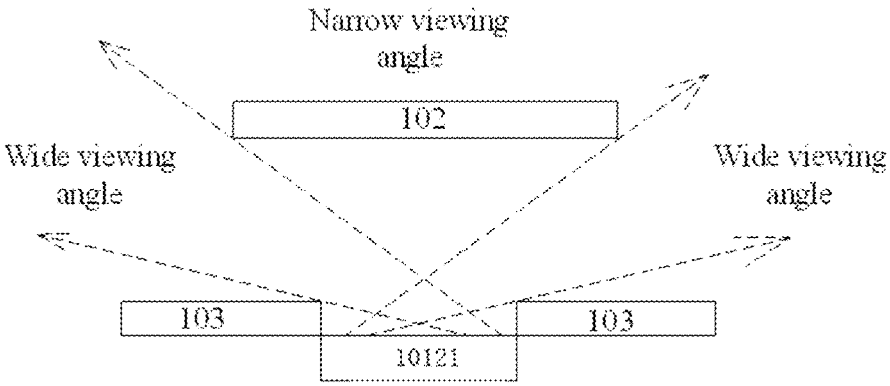
FIG. 5 is a schematic diagram showing the anti-view principle of the display panel in accordance with an embodiment of the present disclosure.

Referring to the anti-view principle of the display panel shown in FIG. 5, the display panel includes a first shielding part 102 and a second shielding part 103. The first shielding part 102 is located on a side of the anti-view light-emitting part 10121 in a direction perpendicular to the display panel. Two second shielding parts 103 are arranged on a side of the anti-view light-emitting part 10121 close to the first shielding part 102. A through hole is defined between the two second shielding parts 103, rightly corresponding to the anti-view light-emitting part 10121. The anti-view light-emitting part 10121 corresponds to the first shielding part 102 along the through hole. In this way, when the anti-view light-emitting part 10121 is lighted, the light of the anti-view light-emitting part 10121 in the direction perpendicular to the display panel is blocked by the first shielding part 102. The anti-view light-emitting part 10121 does not interfere with the picture effect within a narrow viewing angle range. However, a part of the light of the anti-view light-emitting part 10121 is emitted obliquely from an edge of the first shielding part 102, thus, the light mixing between the anti-view light-emitting part 10121 and the light-emitting part 10111 can interfere with the picture effect within a wide viewing angle range.

Furthermore, the anti-view pixels F arranged adjacent to the display pixel unit 101 can share the scan lines with the R-red sub-pixel, the B-blue sub-pixel, or the G-green sub-pixel, to light the anti-view light-emitting part 10121 through the scanning signal.

In this way, the adjacent anti-view light-emitting parts 10121 are lighted at different times by different scanning signals, which effectively attracts the attention of the peeper, and achieves better anti-view effect. Furthermore, the adjacent anti-view light-emitting parts 10121 are lighted by the driving tubes of different sizes to have different brightness, thus, the anti-view effect can be further improved. In addition, after the display pixel unit 101 is lighted, the light emitted by the anti-view light-emitting part 10121 can be mixed with the light emitted by the display pixel unit 101 adjacent to the anti-view light-emitting part 10121 to realize the anti-view function in which the anti-view light-emitting parts 10121 have different brightness. Thus, a more multi-dimensional anti-view combination form is formed to achieve better light mixing anti-view effect, and the anti-view function during the line scanning process is more reliable.

Furthermore, in an embodiment, as shown in FIG. 4, a plurality of sub pixels P in the same display pixel unit 101 are arranged along a preset direction, and the anti-view pixel F is arranged at one end of the display pixel unit 101 along the preset direction. In an embodiment, the preset direction may be the row line direction or the column line direction. It is noted that the configuration is not limited to this embodiment, in other embodiments, the sub-pixels in the same display pixel unit 101 can also be arranged as an L shape, and the anti-view pixels are located within an included angle formed by the L shape.

In an embodiment, the first shielding part 102 can be a black matrix.

In an embodiment, the second shielding part 103 can be a black matrix.

In other embodiments, the sub-pixel driving circuit can also be arranged to be electrically connected to the first scan line (e.g., the first scan line S2) and the second scan line (e.g., the second scan line S1(*n*-1) and/or the third scan line S1(*n*)). The scanning signals are input to the first scan line and the second scan line at different times during the line scanning process. Among the multiple anti-view pixel driving circuits, the control ends of the anti-view switch tubes M2' of a part of the anti-view pixel driving circuits share the first scan line with the sub-pixel driving circuits corresponding to the anti-view pixel driving circuits, and the control ends of the anti-view switch tubes M2' of the other part of the anti-view pixel driving circuits share the second scan line with the sub-pixel driving circuit corresponding to the anti-view pixel driving circuits. On this basis, in an embodiment, for two adjacent anti-view pixel driving circuits 1012 in the same row, the control end of one anti-view switch tube M2' shares the first scan line with the sub-pixel driving circuit corresponding to the anti-view pixel driving circuit, and the control end of the other anti-view switch tube M2' shares the second scan line with the sub-pixel driving circuit corresponding to the anti-view pixel driving circuit.

In other embodiments, the sub-pixel driving circuit can also be arranged to be electrically connected to the first scan line. For example, the sub-pixel driving circuit is set as a 2TIC circuit, and the on and off of the sub-pixel are controlled by the switch tube of the sub-pixel driving circuit. The first scan line is connected to the control end of the switch tube of the sub-pixel driving circuit to control the degree to which the switch tube of the sub-pixel driving circuit is turned on. Furthermore, among a plurality of anti-view pixel driving circuits 1012 in the same row, a part of the anti-view pixel driving circuits 1012 share the first scan line with the sub-pixel driving circuit in the current row, and a part of the anti-view pixel driving circuits 1012 share the first scan line with the sub-pixel driving circuit in the previous row, and/or the remaining part of the anti-view pixel driving circuits 1012 shares the first scan line with the sub-pixel driving circuit in the next row. On this basis, in an embodiment, among the multiple anti-view pixel driving circuits 1012 in the same row, for two adjacent anti-view pixel driving circuits 1012, one of the two adjacent anti-view pixel driving circuits 1012 shares the first scan line with the sub-pixel driving circuit in the current row, and the other one shares the first scan line with the sub-pixel driving circuit in the previous row or the next row, which allows the anti-view pixels to be lighted at different times in the line scanning process.

Figure 6:
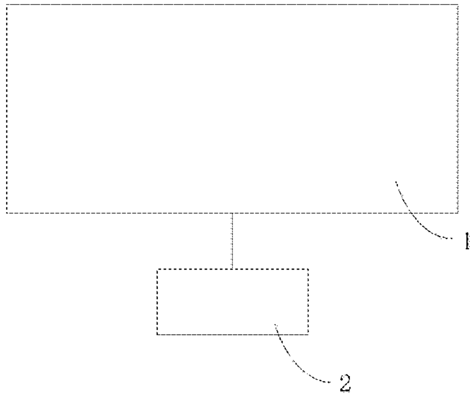
FIG. 6 is a schematic diagram of a display device in accordance with an embodiment of the present disclosure.

As shown in FIG. 6, the present disclosure further provides a display device, which includes a display panel 1 and a motherboard 2 connected to the display panel 1 to drive the display panel 1 to display pictures. The display panel 1 can be one described in any of the above embodiments.

In this embodiment, the display device includes the display panel 1, which includes a plurality of the sub-pixel driving circuits and a plurality of the anti-view pixel driving circuits. The sub-pixel driving circuit is electrically connected to at least one scan line. The anti-view pixel driving circuit includes the anti-view light-emitting part 10121 and the anti-view switch tube for controlling the on and off of the anti-view light-emitting part 10121. The anti-view pixel driving circuits are respectively connected to the sub-pixel driving circuits such that the control end of the anti-view switch tube of the anti-view pixel driving circuit shares the scan line with the sub-pixel driving circuit. The scanning signals are input to the scan lines of at least two sub-pixel driving circuits at different times during the line scanning process, such that the scanning signals are input to the control ends of the anti-view switch tubes of at least two anti-view pixel driving circuits at different times. Thus, in the line scanning process, the anti-view light-emitting parts 10121 are lighted at different times, resulting in the effect that the anti-view light-emitting parts 10121 flicker dynamically, which can better attract the attention of the peeper, significantly increase the interference effect, and improve the anti-view performance, compared with the way that all the anti-view light-emitting parts 10121 are lighted at the same time. In addition, the technical solution of the embodiment adopts the way that the anti-view pixel driving circuit shares the scan line with the sub-pixel driving circuit to realize the anti-view function, which has a simple structure and a convenient transformation, and is beneficial to the promotion of the display device in the field.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all comprised in the protection scope of the patents of the present application.

What is claimed is:

1. A display panel with anti-view pixel driving circuits connected to sub-pixel driving circuits to prevent peeping under wide view angles, comprising:

a plurality of sub-pixel driving circuits each of which is electrically connected to at least one scan line; and a plurality of anti-view pixel driving circuits each of which comprises an anti-view light-emitting diode and an anti-view switch tube for controlling an on and off of the anti-view light-emitting diode, the plurality of anti-view pixel driving circuits being respectively connected to the plurality of sub-pixel driving circuits such that a control end of the anti-view switch tube of each anti-view pixel driving circuit shares a scan line with a corresponding sub-pixel driving circuit, wherein scanning signals are input to scan lines of at least two sub-pixel driving circuits at different times during a line scanning process, such that the scanning signals are input to the control ends of the anti-view switch tubes of at least two anti-view pixel driving circuits at different times;

wherein each sub-pixel driving circuit is electrically connected to a first scan line and a second scan line, and the scanning signals are input to the first scan line and the second scan line at different times during the line scanning process to create a flickering effect from the anti-view pixel driving circuits;

the control ends of the anti-view switch tubes of a part of the plurality of anti-view pixel driving circuits share the first scan line with the plurality of sub-pixel driving circuits corresponding to the part of the plurality of anti-view pixel driving circuits, and the control ends of the anti-view switch tubes of the other part of the plurality of anti-view pixel driving circuits share the second scan line with the plurality of sub-pixel driving circuits corresponding to the other part of the plurality of anti-view pixel driving circuits.

2. The display panel according to claim 1, further comprising:

a plurality of driving tubes respectively electrically connected to the scan lines, wherein the plurality of driving tubes have different sizes.

3. The display panel according to claim 1, wherein each sub-pixel driving circuit is further electrically connected to a power supply voltage line and a common ground voltage line, and each anti-view pixel driving circuit further comprises:

an anti-view driving tube; wherein a first end of the anti-view driving tube shares the power supply voltage line with the corresponding sub-pixel driving circuit and a second end thereof electrically connected to a first node, wherein one end of the anti-view light-emitting diode is electrically connected to the first node, the other end of the anti-view light-emitting diode shares the common ground voltage line with the corresponding sub-pixel driving circuit, and a control end of the anti-view driving tube is electrically connected to a second node; and a first capacitor connected between the first node and the second node;

wherein the first end of the anti-view switch tube is electrically connected to the second node, and the second end of the anti-view switch tube is electrically connected to first data line.

4. The display panel according to claim 1, wherein for any two adjacent anti-view light-emitting diodes in the same row, the anti-view pixel driving circuit having one of the two anti-view light-emitting diodes shares the first scan line with the sub-pixel driving circuit corresponding to the anti-view pixel driving circuit, and the anti-view pixel driving circuit having the other anti-view light-emitting diode shares the second scan line with the sub-pixel driving circuit corresponding to the other anti-view pixel driving circuit.

5. A display panel with anti-view pixel driving circuits connected to sub-pixel driving circuits, comprising:

a plurality of sub-pixel driving circuits each of which is electrically connected to at least one scan line; and a plurality of anti-view pixel driving circuits each of which comprises an anti-view light-emitting diode and an anti-view switch tube for controlling an on and off of the anti-view light-emitting diode, the plurality of anti-view pixel driving circuits being respectively connected to the plurality of sub-pixel driving circuits such that a control end of the anti-view switch tube of each anti-view pixel driving circuit shares a scan line with a corresponding sub-pixel driving circuit, wherein scanning signals are input to scan lines of at least two sub-pixel driving circuits at different times during a line scanning process, such that the scanning signals are input to the control ends of the anti-view switch tubes of at least two anti-view pixel driving circuits at different times;

wherein each sub-pixel driving circuit is electrically connected to a first scan line, a second scan line and a third scan line, and the scanning signals are input to the first scan line, the second scan line and the third scan line at different times during the line scanning process;

the control ends of the anti-view switch tubes of a part of the plurality of anti-view pixel driving circuits share the first scan line with the plurality of sub-pixel driving circuits corresponding to the part of the plurality of anti-view pixel driving circuits, and the control ends of the anti-view switch tubes of another part of the plurality of anti-view pixel driving circuits share the second scan line with the plurality of sub-pixel driving circuits corresponding to the another part of the plurality of anti-view pixel driving circuits, the control ends of the anti-view switch tubes of the remaining part of the plurality of anti-view pixel driving circuits share the third scan line with the plurality of sub-pixel driving circuits corresponding to the remaining part of the plurality of anti-view pixel driving circuits.

6. The display panel according to claim 5, wherein for any three adjacent anti-view light-emitting diodes in the same row, the anti-view pixel driving circuit having one anti-view light-emitting diode shares the first scan line with the sub-pixel driving circuit corresponding to the anti-view pixel driving circuit, the anti-view pixel driving circuit having another anti-view light-emitting diode shares the second scan line with the sub-pixel driving circuit corresponding to the another anti-view pixel driving circuit, and the anti-view pixel driving circuit having the remaining anti-view pixel shares the third scan line with the sub-pixel driving circuit corresponding to the remaining anti-view pixel driving circuit.

7. The display panel according to claim 5, wherein each sub-pixel driving circuit comprises:

a first switch tube with a control end thereof electrically connected to a control signal line, a first end thereof electrically connected to a power supply voltage line, and a second end thereof electrically connected to a second sub-node;

a second switch tube with a control end thereof electrically connected to the first scan line, a first end thereof electrically connected to a second data line, and a second end thereof electrically connected to the second sub-node;

a third switch tube with a control end thereof electrically connected to a first sub-node, a first end thereof electrically connected to the second sub-node, and a second end thereof electrically connected to a third sub-node;

a second capacitor with one end thereof electrically connected to the power supply voltage line, and the other end thereof electrically connected to the first sub-node;

a fourth switch tube with a control end thereof electrically connected to the first scan line, a first end thereof electrically connected to the third sub-node, and a second end thereof electrically connected to the first sub-node;

a fifth switch tube with a control end thereof electrically connected to the second scan line, a first end thereof electrically connected to a reference voltage signal line, and a second end thereof electrically connected to the first sub-node;

a sixth switch tube with a control end thereof electrically connected to the control signal line, a first end thereof electrically connected to the third sub-node, and a second end thereof electrically connected to a fourth sub-node; and a seventh switch tube with a control end thereof electrically connected to the third scan line, a first end thereof electrically connected to the reference voltage signal line, a second end thereof electrically connected to the fourth sub-node;

wherein each sub-pixel driving circuit is configured to drive the anti-view light-emitting diode, and the anti-view light-emitting diode is connected in series between the fourth sub-node and a common ground voltage line.

8. The display panel according to claim 1, wherein the display panel comprises a plurality of display pixel units each of which comprises a plurality of sub-pixels, wherein each sub-pixel responds to a sub-pixel driving circuit, and at least one anti-view pixel is arranged between two adjacent display pixel units, wherein each anti-view pixel responds to an anti-view pixel driving circuit;

a plurality of sub-pixels in the same display pixel unit are arranged along a preset direction, and the anti-view pixel is arranged at an end of the display pixel unit along the preset direction.

9. A display device with anti-view pixel driving circuits connected to sub-pixel driving circuits to prevent peeping under wide view angles, comprising a display panel and a motherboard connected to the display panel;

wherein the display panel, comprises:

a plurality of sub-pixel driving circuits each of which is electrically connected to at least one scan line; and a plurality of anti-view pixel driving circuits each of which comprises an anti-view light-emitting diode and an anti-view switch tube for controlling an on and off of the anti-view light-emitting diode, the plurality of anti-view pixel driving circuits being respectively connected to the plurality of sub-pixel driving circuits such that a control end of each anti-view switch tube of each anti-view pixel driving circuit shares a scan line with a corresponding sub-pixel driving circuit, wherein scanning signals are input to scan lines of at least two sub-pixel driving circuits at different times during a line scanning process, such that the scanning signals are input to the control ends of the anti-view switch tubes of at least two anti-view pixel driving circuits at different times;

wherein each sub-pixel driving circuit is electrically connected to a first scan line and a second scan line, and the scanning signals are input to the first scan line and the second scan line at different times during the line scanning process to create a flickering effect from the anti-view pixel driving circuits;

the control ends of the anti-view switch tubes of a part of the plurality of anti-view pixel driving circuits share the first scan line with the plurality of sub-pixel driving circuits corresponding to the part of the plurality of anti-view pixel driving circuits, and the control ends of the anti-view switch tubes of the other part of the plurality of anti-view pixel driving circuits share the second scan line with the plurality of sub-pixel driving circuits corresponding to the other part of the plurality of anti-view pixel driving circuits.

10. The display device according to claim 9, further comprising:

a plurality of driving tubes respectively electrically connected to the scan lines, wherein the plurality of driving tubes have different sizes.

11. The display device according to claim 9, wherein each sub-pixel driving circuit is further electrically connected to a power supply voltage line and a common ground voltage line, and each anti-view pixel driving circuit further comprises:

an anti-view driving tube; wherein a first end of the anti-view driving tube shares the power supply voltage line with a corresponding sub-pixel driving circuit and a second end thereof electrically connected to a first node, wherein one end of the anti-view light-emitting diode is electrically connected to the first node, the other end of the anti-view light-emitting diode shares the common ground voltage line with the corresponding sub-pixel driving circuit, and a control end of the anti-view driving tube is electrically connected to a second node; and a first capacitor connected between the first node and the second node;

wherein the first end of the anti-view switch tube is electrically connected to the second node, and the second end of the anti-view switch tube is electrically connected to first data line.

12. The display device according to claim 9, wherein for any two adjacent anti-view light-emitting diodes in the same row, the anti-view pixel driving circuit having one of the two anti-view light-emitting diodes shares the first scan line with the sub-pixel driving circuit corresponding to the anti-view pixel driving circuit, and the anti-view pixel driving circuit having the other anti-view light-emitting diode shares the second scan line with the sub-pixel driving circuit corresponding to the other anti-view pixel driving circuit.

13. The display device according to claim 9, wherein each sub-pixel driving circuit is electrically connected to a first scan line, a second scan line and a third scan line, and the scanning signals are input to the first scan line, the second scan line and the third scan line at different times during the line scanning process;

the control ends of the anti-view switch tubes of a part of the plurality of anti-view pixel driving circuits share the first scan line with the plurality of sub-pixel driving circuits corresponding to the part of the plurality of anti-view pixel driving circuits, and the control ends of the anti-view switch tubes of another part of the plurality of anti-view pixel driving circuits share the second scan line with the plurality of sub-pixel driving circuits corresponding to the another part of the plurality of anti-view pixel driving circuits, the control ends of the anti-view switch tubes of the remaining part of the plurality of anti-view pixel driving circuits share the third scan line with the plurality of sub-pixel driving circuits corresponding to the remaining part of the plurality of anti-view pixel driving circuits.

14. The display device according to claim 13, wherein for any three adjacent anti-view light-emitting diodes in the same row, the anti-view pixel driving circuit having one anti-view light-emitting diode shares the first scan line with the sub-pixel driving circuit corresponding to the anti-view pixel driving circuit, the anti-view pixel driving circuit having another anti-view light-emitting diode shares the second scan line with the sub-pixel driving circuit corresponding to the another anti-view pixel driving circuit, and the anti-view pixel driving circuit having the remaining anti-view pixel shares the third scan line with the sub-pixel driving circuit corresponding to the remaining anti-view pixel driving circuit.

15. The display device according to claim 13, wherein each sub-pixel driving circuit comprises:

a first switch tube with a control end thereof electrically connected to a control signal line, a first end thereof electrically connected to a power supply voltage line, and a second end thereof electrically connected to a second sub-node;

a second switch tube with a control end thereof electrically connected to the first scan line, a first end thereof electrically connected to a second data line, and a second end thereof electrically connected to the second sub-node;

a third switch tube with a control end thereof electrically connected to a first sub-node, a first end thereof electrically connected to the second sub-node, and a second end thereof electrically connected to a third sub-node;

a second capacitor with one end thereof electrically connected to the power supply voltage line, and the other end thereof electrically connected to the first sub-node;

a fourth switch tube with a control end thereof electrically connected to the first scan line, a first end thereof electrically connected to the third sub-node, and a second end thereof electrically connected to the first sub-node;

a fifth switch tube with a control end thereof electrically connected to the second scan line, a first end thereof electrically connected to a reference voltage signal line, and a second end thereof electrically connected to the first sub-node;

a sixth switch tube with a control end thereof electrically connected to the control signal line, a first end thereof electrically connected to the third sub-node, and a second end thereof electrically connected to a fourth sub-node; and a seventh switch tube with a control end thereof electrically connected to the third scan line, a first end thereof electrically connected to the reference voltage signal line, a second end thereof electrically connected to the fourth sub-node;

wherein each sub-pixel driving circuit is configured to drive the anti-view light-emitting diode, and the anti-view light-emitting part is connected in series between the fourth sub-node and a common ground voltage line.

16. The display device according to claim 10, wherein the display panel comprises a plurality of display pixel units each of which comprises a plurality of sub-pixels, wherein each sub-pixel responds to a sub-pixel driving circuit, and at least one anti-view pixel is arranged between two adjacent display pixel units, wherein each anti-view pixel responds to an anti-view pixel driving circuit;

a plurality of sub-pixels in the same display pixel unit are arranged along a preset direction, and the anti-view pixel is arranged at an end of the display pixel unit along the preset direction.

* * * * *